US005702592A

United States Patent [19]

Suri et al.

[11] Patent Number: 5,702,592

[45] Date of Patent: Dec. 30, 1997

[54] FILTER MONITORING DEVICE WHICH MONITORS DIFFERENTIAL PRESSURE AND TEMPERATURE

[75] Inventors: Kanwar Suri, North Ridge; Z. Paul Akian, Los Angeles, both of Calif.

[73] Assignee: Western Filter Corporation, Valencia, Calif.

[21] Appl. No.: 546,299

[22] Filed: Oct. 20, 1995

[51] Int. Cl.$^{6}$ .................. B01D 35/143

[52] U.S. Cl. .................. 210/90; 73/708; 116/268; 116/DIG. 42; 184/108; 210/94; 210/149; 374/143

[58] Field of Search .................. 210/85, 90, 93, 210/94, 243, 149, 91; 184/6, 24, 108; 116/267, 268, 272, DIG. 42; 73/700, 708, 716, 717, 722, 744, 745; 55/270; 374/143

[56] References Cited

U.S. PATENT DOCUMENTS

| | | | |
|---|---|---|---|
| 3,429,291 | 2/1969 | Hoffman | 73/744 |
| 3,815,542 | 6/1974 | Cooper | 210/149 |
| 3,934,238 | 1/1976 | Pavlou | 210/90 |
| 4,003,870 | 1/1977 | Parquet et al. | 210/149 |
| 4,272,368 | 6/1981 | Foord et al. | 210/90 |
| 4,416,211 | 11/1983 | Hoffman | 73/744 |
| 4,654,140 | 3/1987 | Chen | 210/90 |
| 4,961,845 | 10/1990 | Dawson et al. | 210/243 |
| 5,259,248 | 11/1993 | Ugai et al. | 374/143 |

OTHER PUBLICATIONS

"Spring–piston differential manometer", Measurement Techniques—vol. 19, No. 7, pp. 989–990, Jul. 1976, Chepikov et al.,.

*Primary Examiner*—Joseph W. Drodge
*Attorney, Agent, or Firm*—Emch, Schaffer, Schaub & Porcello Co., L.P.A.

[57] ABSTRACT

A filter monitoring device for use in monitoring the purity of a fluid through a filter includes a pressure differential sensing device in communication with the filter. The filter monitoring device defines an inlet port which is in communication with the supply of fluid upstream of the filter and an outlet port which is in communication with a supply of fluid downstream of the filter. The differential pressure sensing device comprises at least one movable device which is in contact with both the upstream and downstream supplies of fluid and moves in response to changes in the pressure differential of the fluid. Different total differential pressures are accommodated by corresponding stiffness of a biasing device. The differential pressure sensing device also comprises a distance sensing device which continuously measures or detects the distance of travel of the movable device. The distance sensing device is operatively connected to at least one indicator device which conveys or transmits the status of the pressure differential of the fluid in the filter assembly.

29 Claims, 6 Drawing Sheets

FILTER MONITORING DEVICE WHICH MONITORS DIFFERENTIAL PRESSURE AND TEMPERATURE

FIELD OF THE INVENTION

The present invention relates to an electronic apparatus for monitoring the differential pressure of a fluid across a filter element. In particular, the present invention relates to an apparatus that quickly, accurately and continuously measures differential pressure as it develops within a filtration system.

The apparatus, by monitoring the differential pressure without coming into contact with the fluid in the system, has an increased useful sensor life. In certain embodiments, the apparatus also monitors temperature changes in the fluid to render the differential pressure monitoring functional at temperature extremes and to inform about the overheating of the filtration system.

BACKGROUND ART

Many fluid systems, such as hydraulic transmission and lubricating systems, have filter systems to remove particulate contaminates which are present in the circulating fluids. The contaminates in the fluid system may come from an internal or external source. These undesired contaminates affect the quality of the system performance since all moving components in contact with the fluid are damaged by wear from the contaminates flowing through the system. When the viscosity of the fluid is low the fluid flows easily; however, when the viscosity is high the fluid moves slower or flows with difficulty. The high viscous fluid requires a greater amount of power to move the fluid due to the higher resistance of the fluid to flow. The high fluid viscosity causes a pressure drop across valves and lines in the filtration system and in the fluid system itself. On the other hand, if a fluid has too low a viscosity, there is increased leakage across seals and excessive wear to the moving components in contact with the fluid when an oil or fluid film between the moving parts is interrupted or broken down.

These fluid systems require constant pressures of fluid flowing through the system. Since high levels of contaminates decrease the life and efficiency of the machinery associated with the fluid system, the fluid system has a filter assembly to remove the unwanted impurities. Furthermore, the life and efficiency of the machinery is increased with prompt replacement of the filter element when the levels of contamination reach a certain point.

The life of a filter element is monitored by a device commonly referred to as a "filter indicator." The indicators, which typically are either electrical or visual devices, are calibrated for a preset or predetermined pressure setting. Once the predetermined pressure setting is exceeded, the indicator provides a warning to the user. The warning provides the user with an opportunity to change the filter element.

In certain types of indicators, the level of contamination in a fluid is determined by passing portions of the fluid through a filter medium until a predetermined pressure differential is achieved across the filter medium. However, these indicators only provide an "all-or-nothing" type of response since the indication occurs only when the indicator registers or exceeds a preset pressure. In electrical devices where indication is based on single pole double throw (SPDT) switches, an indication occurs when the normally open circuit becomes normally closed.

Also, it is a common practice to replace hydraulic or pneumatic filters on a pre-established or fixed time schedule. However, this practice is susceptible to human errors, wasting of yet properly functioning filters, or the deterioration of the hydraulic/pneumatic system's useful performance or life by operating the system without filters or with clogged or underrated filters.

In addition, it would be beneficial to be able to monitor the changes in temperature of the fluid flowing through the fluid system. Many fluids become thicker or more viscous as the temperature of the fluid decreases and thinner or less viscous as the temperature of the fluid increases. If the fluid temperature is too high and the fluid becomes too thin, the additives in fluid can breakdown or disintegrate. The disintegrated parts of the fluid cause wear on the moving components just as a fluid that is too thick will also cause wear on the moving components. Therefore, it is desirable to have the fluid at an optimum viscosity and an optimum temperature in order to have smoothly moving components. However, it is not easy to control the temperature of the fluids since heat is generated by the fluid system itself and by the environmental conditions surrounding the fluid system.

It would be impossible to monitor the differential pressure without monitoring, in a continuous manner, both the viscosity of the fluid circulating through the fluid system and the temperature of the fluid in the fluid system. Therefore, there exists a need to provide a filter indicator or monitoring device that will provide an indication of continuous pressure differential as the pressure differential develops and changes within the filtration system to prevent false alarms.

It is therefore a main object of the present invention to provide an effective and efficient filter monitoring device.

It is an additional object of the present invention to provide a filter monitoring device that continuously monitors the differential pressure in a fluid system.

It is a further object of the present invention to provide a filter monitoring device which has increased accuracy over currently available filter indicators.

It is a further object of the present invention to provide a filter monitoring device which is cost effective to manufacture and to the end user.

It is a further object of the present invention to provide a filter monitoring device which provides an indication of the remaining useful life of the device.

It is a further object of the present invention to provide a filter monitoring device which continuously senses the temperature in the fluid to prevent false alarms.

These and other objects of the present invention will become readily apparent from a reading of the detailed description which follows.

SUMMARY OF THE INVENTION

The present invention provides a filter monitoring device which overcomes the drawbacks discussed above. The filter monitoring device of the present invention provides a continuous monitoring of a pressure differential across a filter medium as the pressure differential changes within the filtration system.

According to the present invention, the filter monitoring device of the present invention is installed in a filter assembly. The filter monitoring device of the present invention is a self-diagnosing and self-prognosing low cost filter indicator. The filter monitoring device of the present invention provides advantages over the currently available filter indicators by providing a rupture-proof, non-contacting and a long-life filter indicating device. The filter indicating device continuously monitors the pressure differential within a filtration system and, and in certain embodiments, further monitors the temperature of the fluid within the filtration system. In addition, the filter monitoring device provides an indication of the conditions within the filter assembly which can be observed both at the filter assembly itself and at a location remote from the filter assembly. According to a preferred embodiment, the filter monitoring device has, for example, at least one indicator means, such as a visual indicator (for example a light emitting-diode (LED) light), on the filter assembly itself to immediately register any warning or caution to the user. The visual indicator on the filter monitoring device itself provides a cost effective device, both in terms of design of the filter monitoring device and in terms of a quick response to any changes which must be made to the filter assembly.

The filter monitoring device is operatively connected to a location remote or distant from the filtration assembly to continuously register and record the presence or absence of a filter, blockage of the filter, under-rating conditions and cold fluid conditions. In a preferred embodiment, the filter monitoring device is electrically connected to a centrally located control panel or a personal computer (PC) means. The control panel both provides and records continuous data regarding the status of the filter itself, the purity of the fluid being filtered, and the temperature of the fluid being filtered. In an especially preferred embodiment, the filter monitoring device has at least one indicator means to show normal operating conditions and at least one indicator means to show less-than optimum and/or dangerous or undesirable operating conditions. The filter monitoring device can have one or more indicator means at the filter assembly and/or at a remote location. The indicator means can be a visual and/or audio means to signal the efficiency of the filter "on the spot" so that the user or operator can appropriately respond to the signals being provided by the indicator means.

The filter monitoring device of the present invention senses and responds to any change in the differential pressure within the filter system. The filter monitoring device is not susceptible to excessive or over pressure of the fluid. The filter monitoring device is both more sensitive and more durable than diaphragm-type or dual pressure sensing indicators which are in contact with the fluid in the system and consequently are susceptible to diaphragm ruptures or large errors.

Another advantage of the present invention is that the filter monitoring device can include a continuous temperature measuring sensing means which continuously monitors the temperature of the fluid within the filter assembly. In a preferred embodiment, the temperature measuring sensing means monitors the temperature by monitoring the temperature of the housing of the filter monitoring device. These temperature measurements provide information about the viscosity of the fluid which, at low temperatures, increases drastically thus causing damages to the pumping and filtration system. The change in viscosity generates change in differential pressure across the filter, confusing the differential pressure readout. The information provided by continuously measuring the temperature thus provides the operator with information in order to override cold fluid temperatures, false pressure or over pressure readouts and to provide high temperature indications.

In a preferred embodiment, the filter monitoring device provides continuous signals which indicate both high and low differential pressures. It is to be noted that low pressure differentials can arise from the absence of a filter or the presence of an underrated filter, (which is an inappropriate type of filter that is inadvertently present in the filter assembly).

The indicator means generates a signal (preferably an electrical signal) which is proportional to the differential pressure being measured. The continuous signals generated by the differential pressure sensing means and/or the temperature sensing means are transmitted to a control panel and/or computer type of device. The control panel and/or personal computer both records the continuous operation of the filter assembly by receiving and storing continuous data regarding the pressure and the temperature of the fluid within the filtration assembly. In preferred embodiments, the control panel and/or personal computers provide the appropriate data to distinguish inoperative electronics from missing filters or clogged filter conditions, using either discrete electronic components or micro-controllers. It is to be understood that in various embodiments, the micro-controller circuitry provides built-in testing, dedicated calibration and PC interrogation capabilities.

Yet another advantage of the present invention is that at least one warning indicator means, for example, a red LED light can be located both on the filter monitoring device itself and on a remote control panel to immediately show high and/or low pressure conditions. It is to be further understood that the warning indicator means can also, or alternatively, provide an audio signal to warn the user or operator that less than optimum operating conditions are present. Another indicator means, for example, a green LED light can be present to represent the presence of unclogged, appropriate filter cartridges and normal operating conditions.

The filter monitoring device measures the pressure differential between upstream pressure and downstream pressure of the fluid within the filtration assembly. The filter monitoring device has a pressure differential which is in communication with the fluid flowing through the filter assembly. The pressure differential responds to any change in the fluid pressure. The pressure differential comprises at least one movable means and at least one distance or travel sensing means. The movable means is in communication with at least a portion of the fluid flowing through the filtration assembly. The movable means moves in a certain direction in response to changes in the fluid pressure. As the movable means is moved in a certain direction by the fluid pressure, the distance sensing means detects the distance that the movable means has travelled. The distance travelled by the movable means corresponds to changes in the differential fluid pressure.

According to the present invention, the pressure differential provides a surge control to the filter monitoring device which is both more rigid and more cost effective than diaphragm type monitoring devices. In a diaphragm type device, the diaphragm itself is both in contact with the fluid and also responds to pressure changes in the fluid which makes the diaphragm susceptible to rupturing.

In one preferred embodiment, the movable means comprises at least one magnet means. The magnet means is in a spaced apart relationship to the distance sensing means. In operation, movement of the movable means in response to a change in fluid pressure causes movement of the magnet means in a direction toward the distance sensing means. The magnet means on the movable means moves in a direction toward or away from the distance sensing means as the differential pressure changes. The distance sensing means is responsive to the changing magnetic fields as the magnet means moves either toward or away from the distance sensing means. The distance sensing means continuously measures the changes in distance between the movable means and the distance sensing means.

In another embodiment, the pressure differential comprises a first movable means and a second movable means which is in a spaced apart relationship to the first movable means. The first movable means is in communication with a portion of the fluid flowing through the filter assembly. The first movable means moves in response to changes in fluid pressure. The movement of the first movable means causes the second movable means to move in response to the movement of the first movable means. In one embodiment, the first movable means comprises at least one magnet means and the second movable means comprises at least one second magnet means. The first magnet means is in a spaced apart relationship to the second magnet means wherein the like poles of each magnet means are in an adjacent, yet spaced apart, relationship. In operation, movement of the first movable means in response to a change in fluid pressure causes movement of the first magnet means in a direction toward the second magnet means. The like polarity causes the first magnet means to repel the second magnet means in a direction away from the first magnet means. The second magnet means on the second movable means moves in a direction toward or away from the distance sensing means as the pressure changes. The distance sensing means continuously measures the changes in distance between the second movable means and the distance sensing means.

The filter monitoring device can utilize various means for continuously measuring a distance that the distance sensing means moves or travels. It is to be understood that, in certain embodiments, the distance motion sensing means can employ "contacting" means which are, for example, resistance or piezoresistance devices wherein the movable means comes into physical contact with the distance sensing means.

It is further to be understood, however, that in various preferred embodiments, the distance sensing means employs non-contacting means wherein the movable means does not come into physical contact with the distance sensing means. "Non-contacting" distance sensing means which utilize the Hall effect, reluctance, capacitance, inductance, ultrasonic or optical devices are especially preferred. In various embodiments, the distance sensing means can comprise, for example, a Hall effect device for measuring potential difference created between two edges of a metal strip carrying a longitudinally flowing electric circuit, when the plane of the strip is placed perpendicularly across the magnetic field. Another distance sensing means can comprise a reluctance type device for measuring change in impedance of a magnetized body due to change in distance of magnetic elements. Another distance sensing means can comprise a capacitance device comprising a system of conductors and dielectrics which permit storage of electricity when there are potential differences between the conductors. Still another distance sensing means can comprise an inductance device such as an electric circuit which determines the electromotive force produced by a change of current in a neighboring circuit. Still another distance sensing means can comprise an ultrasonic device for measuring acoustic waves of a desired frequency and changes in the waves due to motion or travel of the movable means.

Still another distance sensing means can comprising an optical device for measuring optical waves of a desired frequency and changes in the frequency due to motion or travel of the movable means.

One advantage of using a non-contacting distance sensing means is that there are no linkage or wear problems of various contacting parts with the fluid which would decrease the useful life of the filter monitoring device. The distance sensing means detects (and transfers data) about the movement of the movable means in response to changes in the differential pressure. The use of the non-contacting distance sensing means further extends the useful life of the filter monitoring device and greatly increases the wear resistance capability of the filter monitoring device.

In the preferred embodiments, the filter monitoring device is operatively connected to a further indicator and/or recording means. When the pressure differential is lower than a predetermined rate, the filter monitoring device continuously provides data showing that the pressure drop across the filter is within an acceptable level. As the pressure builds within the filter assembly and the filter slowly becomes partially clogged, the filter monitoring device provides an indication of the useful remaining life of the filter element. This prediction of remaining useful life is useful for reducing maintenance schedules and/or premature or overdue changes in the filter element. Further, there is no parasitic power loss to the filter assembly due to any partially clogged filter element when using the filter monitoring device of the present invention. Further, the filter assembly is immune to burst pressure typically found with a diaphragm type device. Any wide fluctuations in the pressure of the fluid in the system does not affect the filter monitoring device of the present invention.

If the pressure differential exceeds the predetermined rate however, the filter monitoring device activates at least one warning device. The warning indicates to the user that it is time to change the filter element or that less than optimum operating conditions exist. This continuous live data is recorded and translated as changes in the pressure differential develop within the filter assembly. Thus, at any given time, the filter monitoring device provides real time data of the pressure differential across the filter element.

Further, the filter monitoring device sends a warning signal if a filter element is missing in the housing. This warning signal is activated by a showing of low system pressure differential.

In preferred embodiments of the present invention, the filter monitoring device also has a temperature sensing means which continuously measures the temperature of the fluid in the filter assembly by measuring the temperature of the housing of the filter monitoring device. In preferred embodiments of the present invention, a filter monitoring device has a suitable non-magnetic housing which can be made, for example, of aluminum, plastic, brass, bronze, non-magnetic stainless steel, ceramic and the like. The nonmagnetic materials provide a "transparent window" for magnetic flux lines. The filter monitoring device compensates for changes in the temperature of the fluid. For example, the filter monitoring device of the present invention can sense the start up of the filtration assembly and provide an "override" (i.e. not give a warning signal) during a cold start. That is, there is no output or warning signal is given when the temperature of the fluid is below a predetermined temperature. However, the filter monitoring device does provide a warning if the fluid temperature exceeds or drops below a predefined working temperature limit.

BEST MODE OF CARRYING OUT INVENTION

Figure 1:
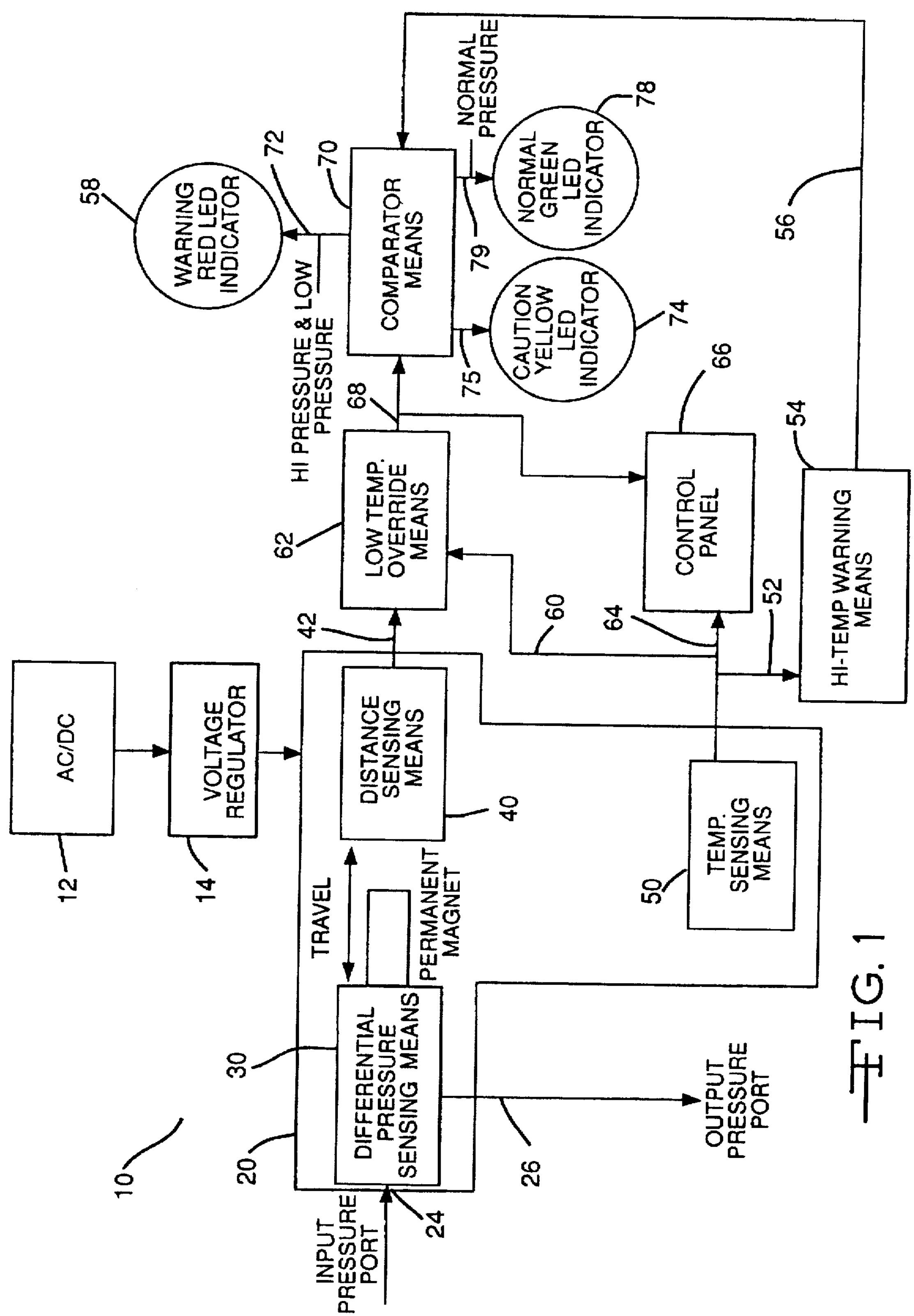
FIG. 1 is a simplified schematic diagram showing the filter monitoring device operatively connected to an indicating and recording means.

Referring now to FIG. 1, a filter monitoring assembly 8 is schematically shown. In the embodiment shown the filter monitoring assembly 8 can be energized by a conventional AC/DC power source 12 which is electrically associated with a voltage regulator 14. However, it should be understood that other sources of power are also contemplated as being useful in the present invention.

The filter monitoring assembly 8 generally comprises a filter monitoring device 20 having a first pressure sensing port 24 and a second sensing port 26. It is to be understood that, while in certain embodiments the first pressure sensing port can be an inlet port and the second pressure sensing port 26 can be an outlet port, the flow of fluid in other embodiments through the ports can be the reverse. Such flow is dependent upon the preferred configuration for the fluid assembly.

The filter monitoring device 20 includes a pressure differential sensing means 25 which comprises a movable means 30 associated with a travel or distance sensing means 40, as will be described in detail below.

In the embodiment shown in FIG. 1, the filter monitoring device 20 further includes a temperature sensing means 50. It should be understood that in certain embodiments of the present invention, the filter monitoring device 20 is also useful without a temperature sensing means. However, the temperature sensing means 50 is being shown herein in a preferred embodiment. In the embodiments shown herein, the filter monitoring assembly 8 further comprises at least one temperature indicator means generally shown as an electronic high temperature warning means 54 and a low temperature override means 62. The temperature sensing means 50 is electrically connected by a wire 52 to the hi-temp warning means 54 and with a wire 60 to low-temp override means 62. Both are connected to comparator means 70 with wires 68 and 56 respectively. The electronic comparator means 70 compares the electrical signals with preset values and provides an on-off signal to the yellow LED means 74. The high temperature warning means 54 is electrically connected by the wire 56 to the comparator means 70. The temperature sensing means 50 is further connected by wire 60 to the comparator means 70 which compares the electronic signal indicating the temperature with a preset electronic value (equivalent to the preset temperature) and provides an on-off signal to the low temperature override means 62. In addition, the distance sensing means 40 is electrically connected by a wire 42 to the low temperature override means 62. The temperature sensing means 50 is also electrically connected by a wire 64 to the control panel 66.

The filter monitoring assembly 8 thus has at least one signalling means for indicating and recording the differential pressure levels and any changes in the pressure levels across the filter element, which signalling means is generally shown as a control panel 66 and the comparator means 72. It should be understood that various methods for receiving, comparing, storing and retrieving data are contemplated as being useful in the present invention and that such methods are considered to be within the scope of the present invention. It is to be further understood that various methods for indicating changes in the pressure differential and/or temperature are contemplated as being useful in the present invention and that such methods are also considered to be within the scope of the present invention.

The low temperature override 62 is electrically connected by a wire 68 to the comparator means 70. The comparator means 70 is electrically associated with the warning indicator means 58 by a wire 72, a caution indicator means 74, such as a yellow LED light, by a wire 75, and a normal indicator means 78, such as a green LED light, by a wire 79. The comparator means 70 receives information from the motion sensing means 40 and provides an ongoing comparison of the differential pressure data being currently received to an electronically preset standard for optimum pressure differential. If the pressure is within normal ranges the comparator means 70 activates the normal indicator means 78. If the temperature rises above or falls below the predetermined "normal" levels, the comparator means 70 activates the caution indicator means 74 (i.e. the yellow LED device). If high or low pressure is present, the comparator means 70 activates the warning indicator means 58.

It is to be understood that the comparator means 70 can provide a numerical percentage of pressure loss and/or can sound an audible alert which is operatively connected to the caution indicator means 74 and/or the warning indicator means 58.

The filter monitoring device 20 monitors any change in pressure between the first pressure sensing port 24 and the second pressure sensing port 26. As the pressure differential between the first pressure sensing port 24and the second pressure sensing port 26 increases, the movable means 30 travels or moves in a direction toward the distance sensing means 40. Thus, the pressure differential sensing means 25 continuously monitors the pressure across a filter element (not shown) to provide an indication of a high pressure drop across the filter element and an indication that the filter element needs to be cleaned or replaced. An increase in the differential pressure across the filter wastes pumping energy which requires additional electrical power by the pump. The differential pressure value, when compared to a known upper level, also provides information such as percentage of the remaining useful filter life. The temperature sensing means 50 monitors any change in temperature of the fluid in the filtration assembly.

Figure 2:
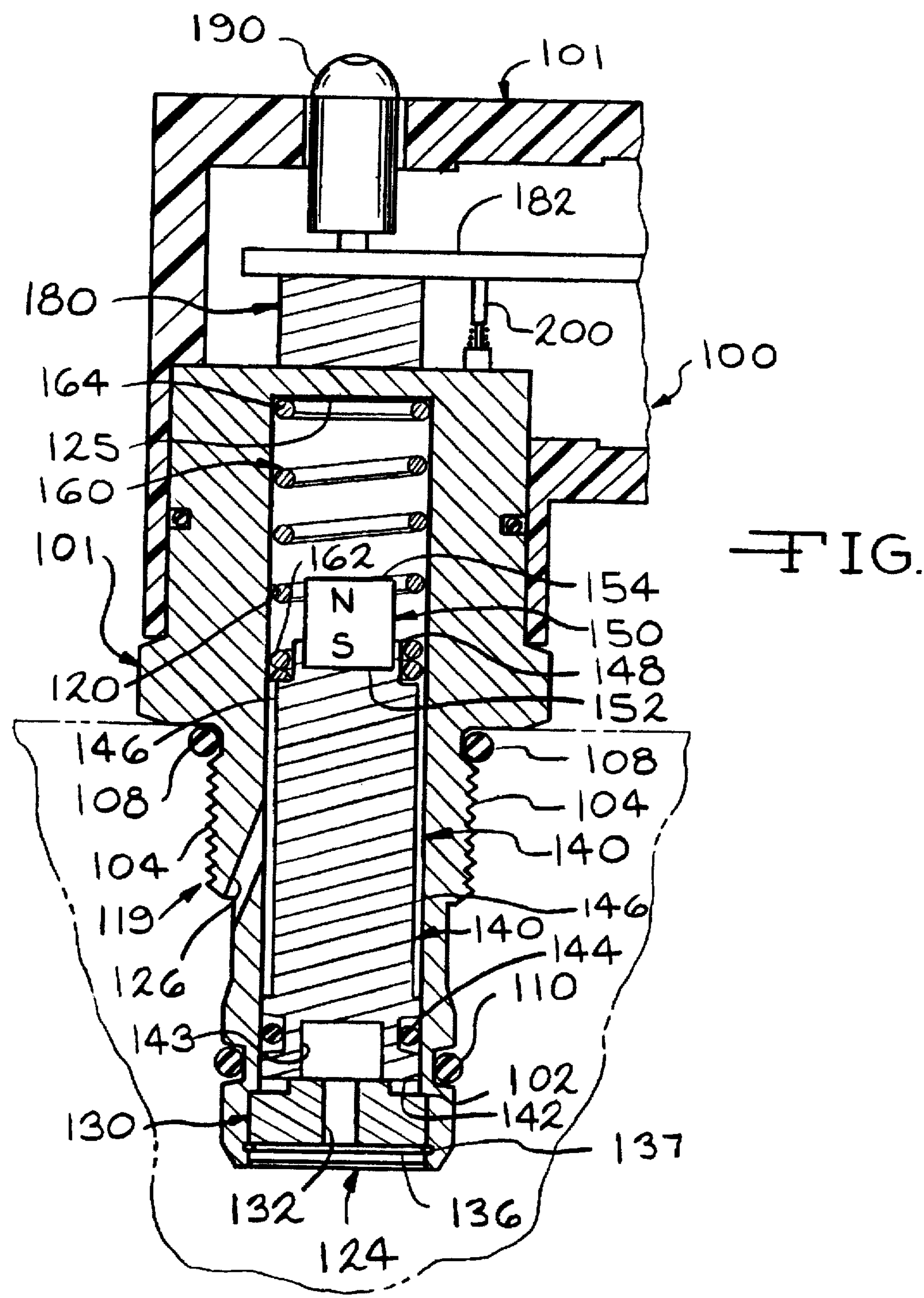
FIG. 2 is a side-elevational view, partially in cross-section, of one embodiment of a filter monitoring device shown in a first position.
Figure 3:
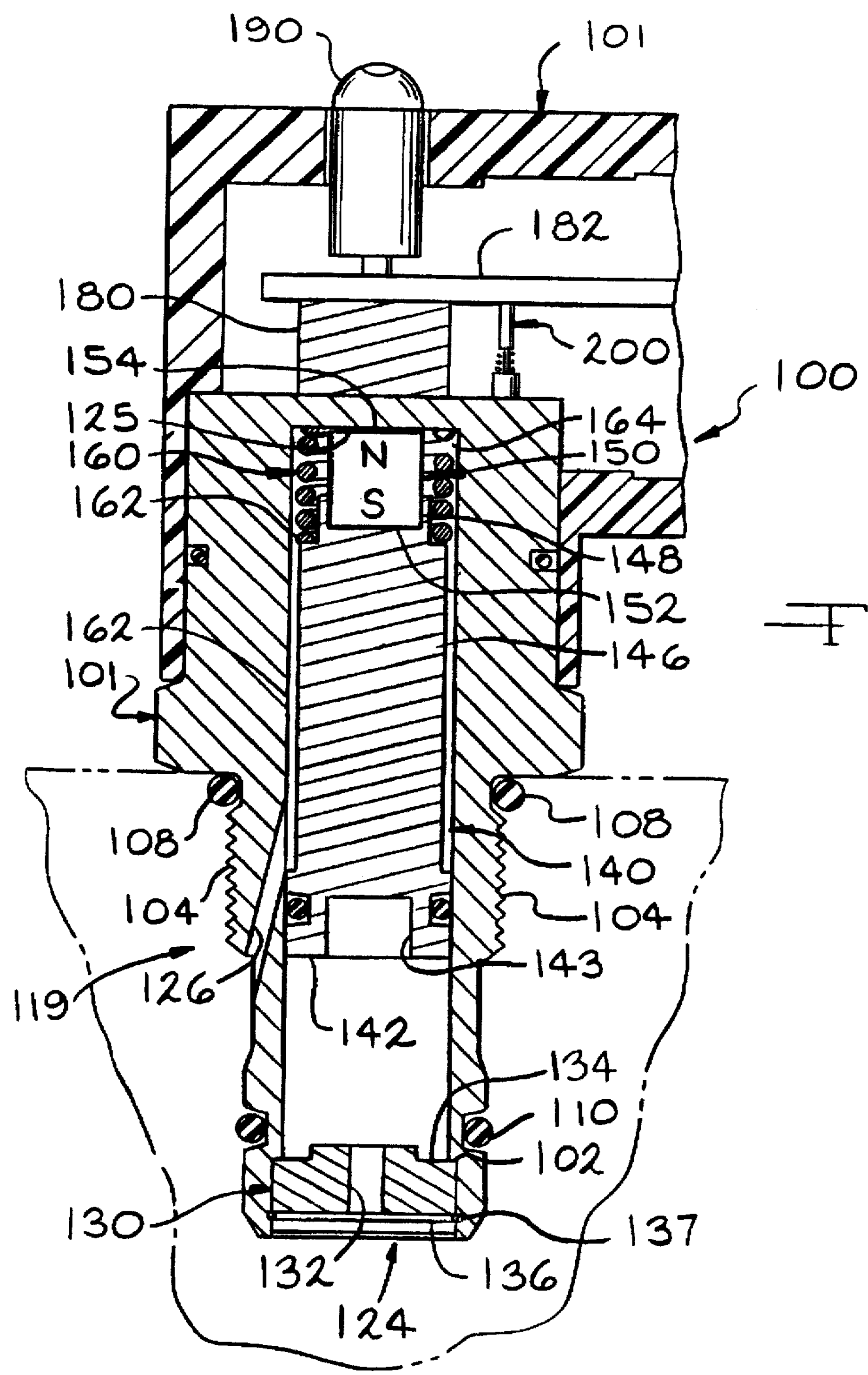
FIG. 3 is a side-elevational view, partially in cross-section, of the embodiment shown in FIG. 2 in a second position.

FIGS. 2–3 show one embodiment of a filter monitoring device 100 which is installed in a filter assembly (not shown). The filter monitoring device 100 generally comprises a housing 101 which is operatively connected to the filter assembly. In the embodiment shown the housing 101 has a threaded exterior portion 104 which threadedly engages a mating surface of the filter assembly. A sealing member 108, such as an O-ring, is adjacent the threaded portion 104 and extends circumferentially around the exterior of the housing 101. The housing 101 is further sealed by a sealing member 110 such as an O-ring, to a portion of the filter assembly that is upstream of the filter element (not shown).

The housing 101 defines an interior chamber 120 having a first or open end 124 and a second opposed or closed end 125. The first end 124 matingly receives an annularly extending member 130 which has at least one passageway 132 axially extending therethrough.

The chamber 120 has a lower interior portion 123 adjacent the first end 124 for receiving the annular member 130. The annular extending member 130 has at least one first upper surface 134 which secured against a detent or edge 102 and a lower surface 136 which is adjacent the open end 124 of the chamber 120. The annularly extending member 130 is sealingly engaged to the interior portion 123 by a sealing means 137, such as a snap ring.

The open end 124 and the axially extending passageway 132 in the annular extending member 130 generally define a first pressure sensing port 124 which allows fluid to flow into the chamber 120, as will be described in detail below. The chamber 120 is in communication with the axially extending passageway 132. The chamber 120 is in communication with the second pressure sensing port 126. In the embodiment shown, the second sensing port 126 extends from the chamber 120 at an angle; however, it is to be understood that the second sensing port 126 can extend from the chamber 120 at other than the angle as shown in the figures herein.

In the embodiment shown in FIGS. 2–3, a pressure differential sensing means 119 is defined, in part, by the chamber 120 which receives a movable means 140. The movable means 140 can comprise a piston which is axially and slidably positioned within the chamber 120.

The movable means 140 has a first end 142 which is adjacent the annular member 130 when the movable means 140 is in a first position, as is shown in FIG. 2. The first end 142 defines a chamber 143 which is in communication with the annularly extending passageway 132 in the annular member 130. The first end 142 is sealing engaged to the chamber 120 by a sealing means 144, such as O-ring.

The movable means 140 further has a second end 148 which is adjacent a middle portion 146. The second end 148 is operatively connected to a magnet means 150. In the embodiment shown the magnet means 150 is oriented such that a first pole 152 is connected to the second end 148 of the movable means 140 and an opposing, second pole 154 is in a spaced apart relationship to the first pole 152.

A biasing means 160 such as a spring, is operatively connected at a first end 162 to the second end 148 of the movable means 140. A second end 164 of the biasing means 150 is adjacent the second end 125 of the chamber 120. When the movable means 140 is in the first position, the biasing means 160 is in a relaxed or noncompressed condition.

In the embodiment shown in FIGS. 2 and 3, the pressure differential sensing means 119 further comprises a distance sensing means 180 which is in a spaced apart relationship from the second end 125 of the chamber 120. The distance sensing means 180 is operatively connected to a control panel or comparator means (not shown in FIGS. 2–3) by a wire or other means (not shown) through a conduit 182 as in a manner generally described in FIG. 1. The distance sensing means 180 continuously monitors the distance of travel of the movable means 140. It is to be understood that various distance sensing means, as discussed above, are useful in the present invention.

In the embodiment shown in FIGS. 2 and 3, the distance sensing means 180 is also operatively connected to at least one indicator means 190 such an LED display light which quickly registers any undesired movement of the movable means 140.

The temperature sensing means 200 provides the data regarding the temperature of the fluid flowing through the filtration system. Any misleading or false readings of changes in pressure due to fluid temperature fluctuations are reduced in incidence. The temperature sensing means 200 is in contact with the housing 101 of the filter monitoring device 100. As the temperature of the fluid flow into the housing 101 rises or falls, the heat of the fluid is dissipated to the housing 101, which housing 101 then either rises or falls in temperature. In a preferred embodiment, the housing 101 is made up of material which readily conduct heat, yet will not interfere with the operation of the magnetic fields of the pressure differential sensing means 119.

It is to be understood that the housing 101 is made of a suitable material both for transmitting the temperature of the fluid and for transmitting data about the changes in the pressure differential. For example, other pressure differential sensing means includes those using, for example, optical devices to measure the distance traveled by the movable means. In such embodiments, at least a portion of the housing is made of a material through which the optical detection of motion can be readily determined. Further, as discussed above, the various other non-contacting distance sensing means are useful with the present invention and it is within the intended scope of the present invention that the housing be compatible with use of such distance sensing means.

It is also to be understood that, by changing various parameters within the filter monitoring device, the filter monitoring device of the present invention can be used to monitor a wide variety of filter elements. For example, in other embodiments, the filter monitoring device can be made so that the diameters or cross-sections and/or the length of the passageway 132 and annular member 130 and/or chamber 120 in the movable means 140 are altered in dimension from what is generally shown in the Figures herein such that the movable means 140 receives greater or less direct pressure from the fluid flowing through the passageway 132 into the chamber 120. In addition, the diameters and/or length of the chamber 120 and/or the movable means 140 can be altered so that the movable means 140 responds to different pressures.

In addition, the "stiffness" or compression strength of the biasing means 160 can be changed such that is easier or more difficult for the movable means 140 to respond to the pressure being exerted upon it.

The different total differential pressures are accommodated by a corresponding spring stiffness or compression strength. That is, the total movement of the movable means 140 is kept substantially constant by varying the "stiffness" of the biasing or spring means 160 according to the appropriate pressure. The stiffness will thus vary with different settings of the differential pressure in the filter element.

Referring now in particular to FIG. 3, when the pressure or force of the upstream fluid entering the first sensing port 124 becomes greater than the pressure or force of the downstream fluid entering the second sensing port 126, the movable means 140 is moved in a direction toward the distance sensing means 180. Increased pressure moves the movable means 140 in a direction toward the second end 125 of the chamber 120 and the biasing means 160 is compressed. As the movable means 140 moves toward the second end 125 of the chamber 120, the magnet moans 150 is axially moved along the chamber 120. As the magnet means 150 approaches the distance sensing means 180, the distance sensing means 180 measures the distance between the magnet means 150 and the distance sensing means 180. The distance sensing means 180 which is electrically associated with the comparator means and/or control panel (not shown in FIG. 3), and continuously registers the movement of the movable means 140, thus showing the high, low or normal pressure occurring across the filter element.

In the embodiment shown in FIGS. 2 and 3, the temperature sensitive means 200 is operatively connected to the housing 101. Again, however it should be understood that the filter monitoring device shown in the embodiment in FIGS. 2 and 3 is also useful without the temperature sensing means and that such temperature sensing means as shown herein is being especially useful in a preferred embodiment of the present invention.

Figure 4:
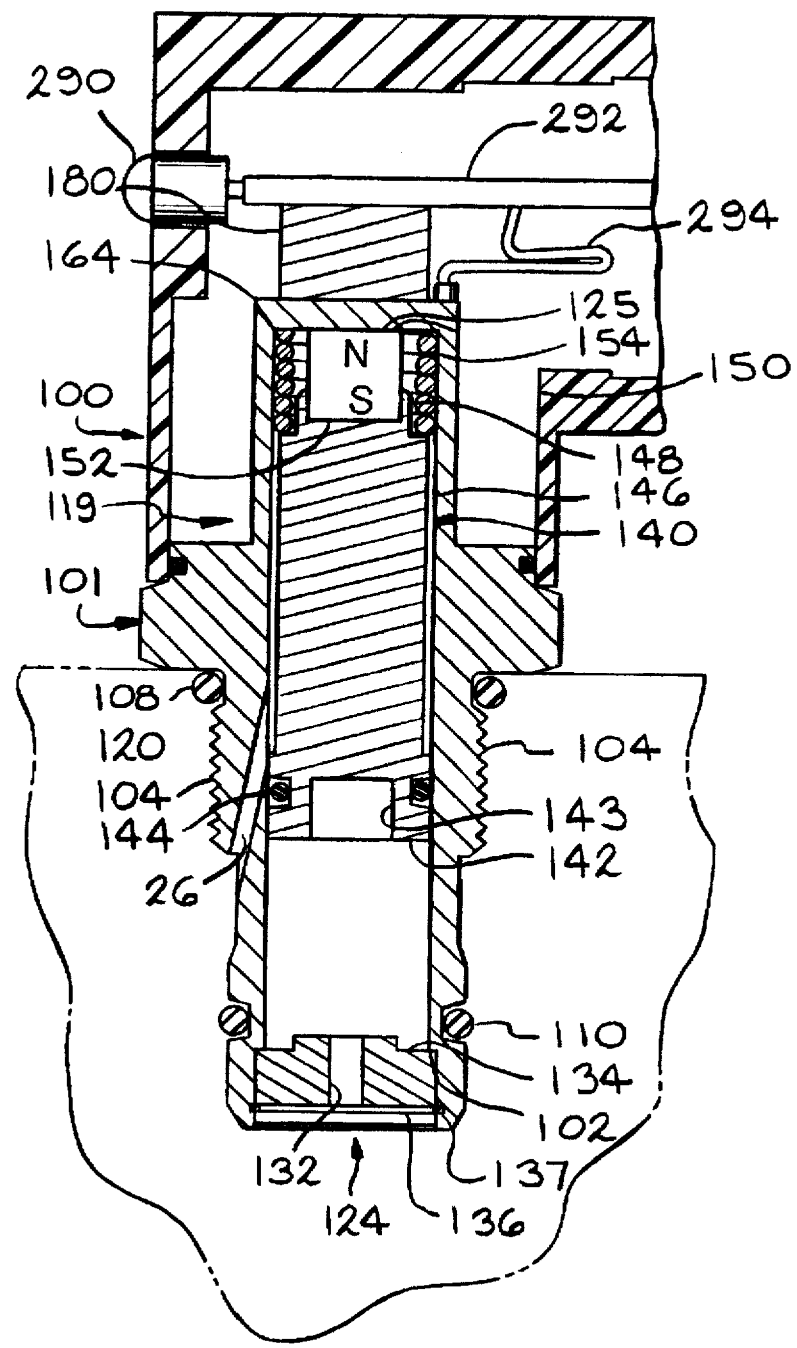
FIG. 4 is a side-elevational view, partially in cross-section, of an other embodiment of a filter monitoring device.

The embodiment shown in FIG. 4 shows an alternative embodiment of at least one indicator means 290 which is operatively connected to a distance sensing means 180 as generally shown in FIGS. 2 and 3. It is to be understood that the features in common with the embodiment shown in FIGS. 2 and 3 have the same numerals for ease of illustration. The indicator means 290 can be displayed on any portion of the housing 101. In the embodiment shown in FIG. 4, the indicator means 290 is operatively connected to a control panel or comparator means (not shown) by a wire (not shown) through a conduit 292 or other suitable device. An alternative temperature sensing means 294 is also operatively connected both to the housing 101 and to the control panel and/or comparator means (not shown) using a wire or other means (not shown) through the conduit 292.

Figure 5:
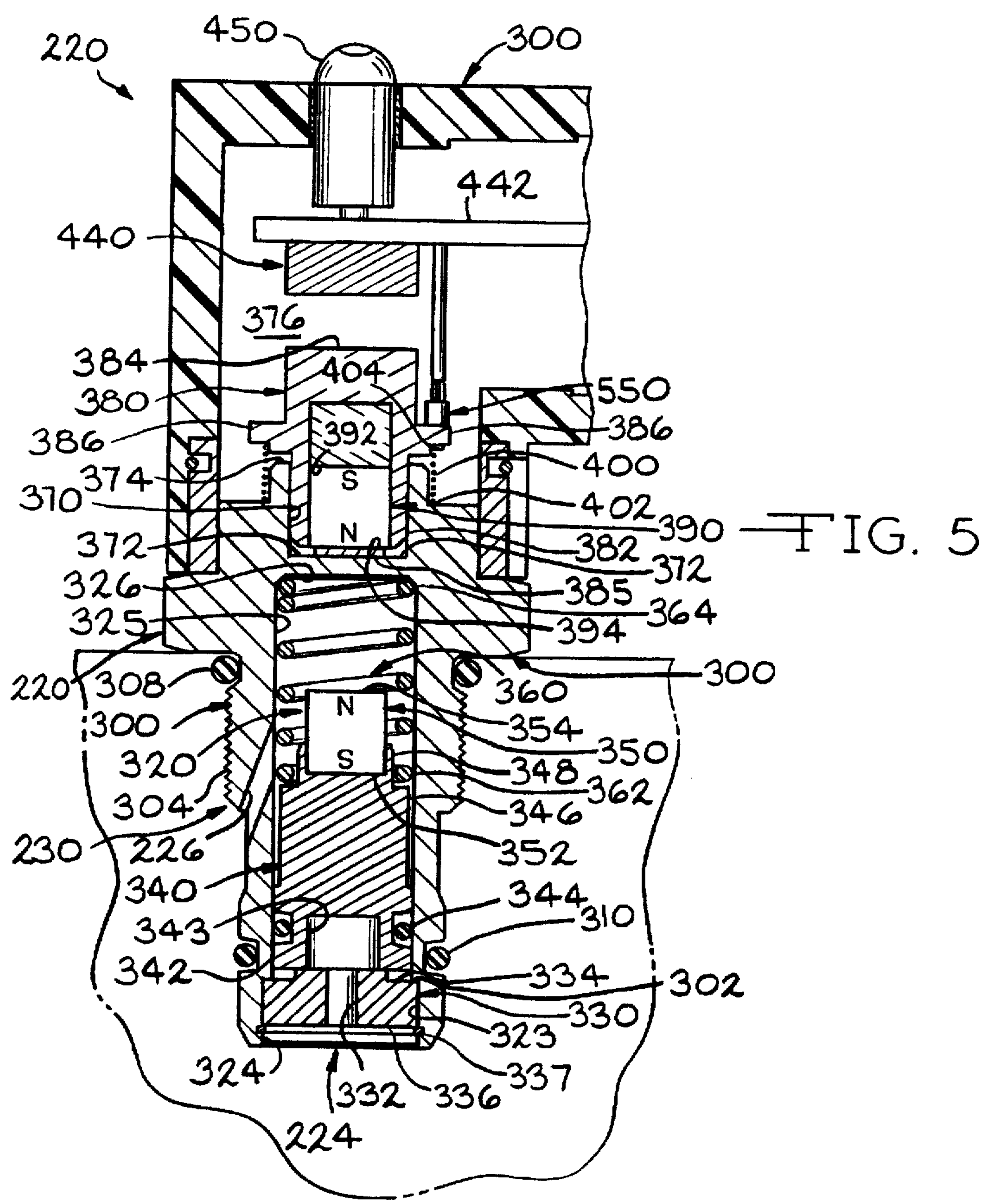
FIG. 5 is a side-elevational view, partially in cross-section, of another embodiment of a filter monitoring device shown in the first position.
Figure 6:
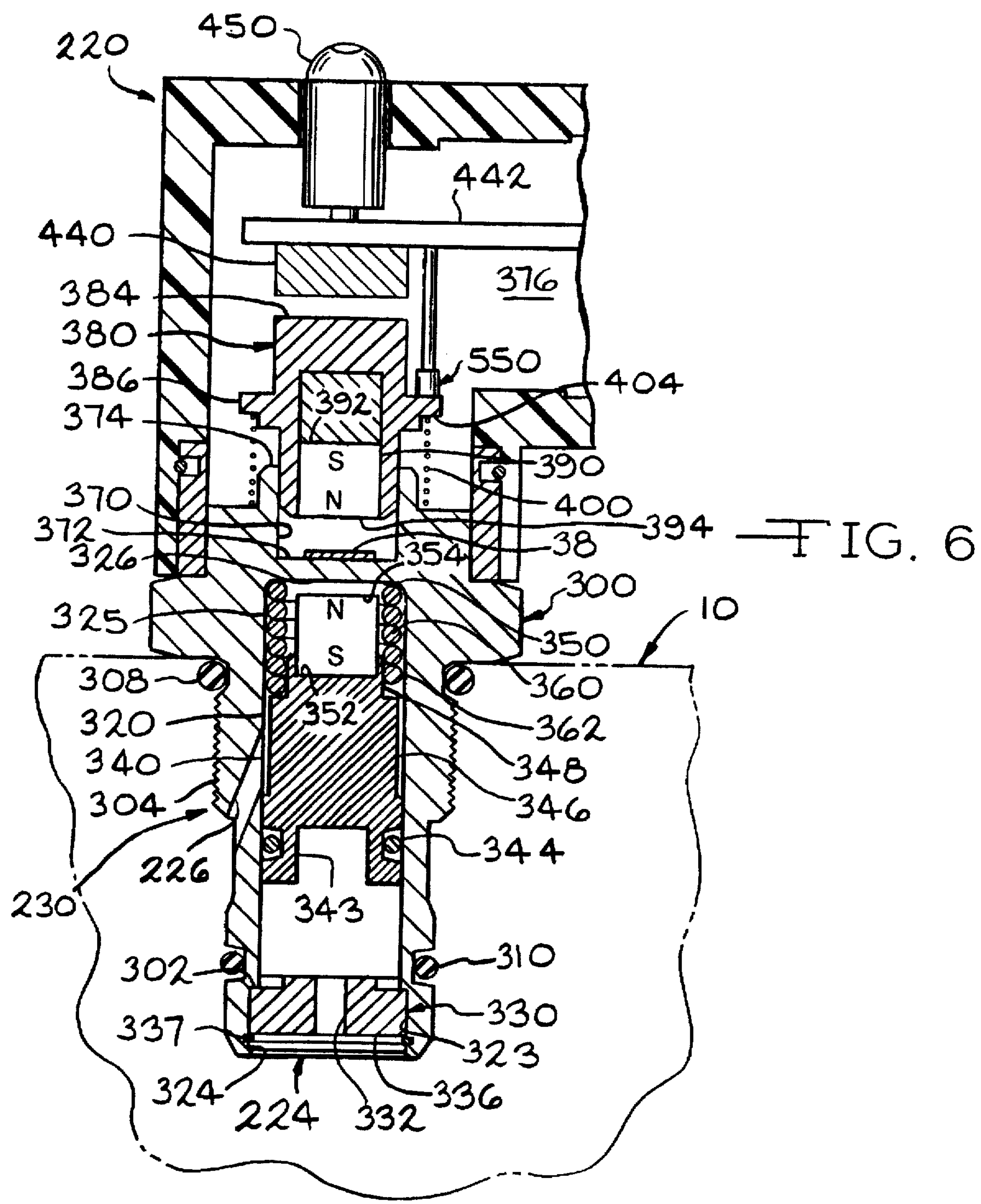
FIG. 6 is a side-elevational view, partially in cross-section, of the embodiment shown in FIG. 5 in a second position.

Referring now to FIGS. 5–6 another embodiment of a filter monitoring device 220 is shown in detail. The filter monitoring device 220 generally comprises a housing 300 which is operatively connected to the filter assembly (not shown). In the embodiment shown, the housing 300 has a threaded exterior portion 304 which threadingly engages a mating surface of the filter assembly. A sealing member 308, such as an O-ring, is adjacent the threaded portion 304 and extends circumferentially around the exterior of the housing 300. The housing 300 is further sealed by a sealing member 310, such as an O-ring, to a portion of the filter assembly that is upstream of the filter element (not shown).

The housing 300 defines an interior chamber 320 having a first or open end 324 and a second opposed or closed end 326. The first end 324 matingly receives an annularly extending member 330 which has at least one passageway 332 axially extending therethrough.

The chamber 320 has a lower interior portion 323 adjacent the first end 324 for receiving the annular member 330. The annularly extending member 330 has at least one upper surface 334 which is secured against a detent or edge 302 and a lower surface 336 which is adjacent the open end 324 of the chamber 320. The annularly extending member 330 is sealingly engaged to the interior portion 323 of the chamber 320 by a sealing means 337, such as snap ring.

The open end 324 and the axially extending passageway 332 in the annularly extending member 330 generally define a first pressure sensing port 224 which allows fluid to flow into the chamber 320, as will be described in detail below.

The chamber 320 is in communication with the axially extending passageway 332. The chamber 320 is in communication with a second pressure sensing port 226. In the embodiment shown the second sensing port 226 extends from the chamber 320 at an angle. In other embodiments however, the second sensing port 226 can extend from the chamber at other than the angle as shown in the Figures herein.

In the embodiment in FIGS. 5 and 6, a pressure differential sensing means 230 is defined, in part, by the chamber 220 which receives at least a first movable means 340 having a first magnet means 350 and at least a second movable means 380 having a second magnet means 390.

The first movable means 340 can comprise a piston which is axially and slideably positioned within an upper interior portion 325 of the chamber 320. The first movable means 340 has a first end 342 which is adjacent the annular member 330 when the first movable means 340 is in a first position (as shown in FIG. 5). The first end 342 defines a chamber 343 which is in communication with the annularly extending passageway 332 in the annular member 330. The first end 342 is sealingly engaged to the second interior portion 325 of the chamber 320 by a sealing means 344 such as an O-ring.

The first movable means 340 further has a second end 348 which is adjacent a middle portion 346. The second end 348 is operatively connected to the first magnet means 350. In the embodiment shown the magnet means 350 is oriented such that a south pole 352 is connected to the second end 348 of the first movable means 340 and a north pole 354 is in a spaced apart relationship to the south pole 352. The north pole 354 extends into the upper interior portion 325 of the chamber 320.

A biasing means 360, such as a spring, is operatively connected at a first end 362 to the second end 348 of the first movable means 340. A second end 364 of the biasing means 360 is adjacent the second end 326 of the chamber 320. When the first movable means 340 is in the first position, the biasing means 360 is in a relaxed or non-compressed condition.

The housing 300 further defines a recess 370 which is in a spaced apart, yet coaxial alignment with the chamber 320. The recess 370 has a first end 372 which is in a spaced apart relationship to the second end 326 of the chamber 320. The recess 370 has a second, opposed end 374 which terminates in an open area 376 in the housing 300.

The second movable means 380 is axially and slideably positioned within the recess 370. The second movable means 380 has a first end 382 which is adjacent the first end 372 of the recess 370 when the second movable means 380 is in a first position (as shown in FIG. 5). The second movable means 380 has a second end 384 which extends beyond the second end 374 of the recess 370 and terminates in the open area 376.

The second magnet means 390 has a south pole 392 and a north pole 394 which is operatively connected to the first end 382 of the second movable means 380. The second magnet means 390 is oriented such that the north pole 394 of the second magnet means 390 is in a spaced apart relationship to the north pole 354 of the first magnet means 350. In the embodiment shown, the south pole 392 is in a spaced apart relationship to the first end 382 of the second movable means 380. The first end 372 of the recess 370 has a magnet holding means 385, such as a piece of steel, which holds the second magnet means 390 in a first position adjacent the first end 372 of the recess 370.

The second movable means 380 has a radially extending flange 386 which engages a biasing means 400, such as a spring. The biasing means 400 is operatively connected at a first end 402 to the housing 300. A second end 404 of the biasing means 400 is adjacent the radially extending flange 386 on the second movable means 380. When the second movable means 380 is in a first position (as shown in FIG. 5) the biasing means 400 is in a compressed condition.

In the embodiment shown in FIGS. 5 and 6, the pressure differential sensing means 230 further comprises a distance sensing means 440 which is in a spaced apart relationship from the second end 384 of the second movable means 380. The distance sensing means 440 is operatively connected by wire or other means (not shown) through a conduit 442 to the comparator means (not shown in FIG. 5). In the embodiment shown, the distance sensing means 440 is also operatively connected to an indicator means 450 such as an LED display light which quickly registers any undesired movement of the second movable means 380.

The distance sensing means 440 continuously monitors the distance of travel of the second movable means 380. In the embodiment shown in FIGS. 5 and 6, the distance sensing means 440 preferably comprises a non-contacting means which measures the axial travel of the second movable means 380. It is to be understood that various distance sensing means including contracting and noncontacting distance sensing means as described above for FIGS. 2 and 3 are also useful in this embodiment of the present invention.

In the embodiment shown, a temperature sensing means 550 is operatively connected to the flange 386 of the second movable means 380. However, it should be understood that the filter monitoring device of the present invention is also useful without the temperature sensing means 550 and that such temperature sensing means 550 is shown herein as being especially useful in a preferred embodiment of the present invention.

The temperature sensing means 550 provides data regarding the temperature of the fluid flowing through the filtration system. Any misleading or false readings of changes in pressure due to fluid temperature fluctuations are reduced in incidence. The temperature sensing means 550 is in contact with the housing 300 of the filter monitoring device 220. As the temperature of the fluid flowing through the housing 300 rises or falls, the heat of the fluid is dissipated to the housing 300, which housing 300 then either rises or falls in temperature. The temperature sensing means 550 responds to the rise or fall in the temperature of the housing 300. In a preferred embodiment the housing 300 is made of a material which readily conducts heat, yet will not interfere with the operation of the magnetic fields.

It is to be understood that, by changing various parameters within the filter monitoring device, the filter monitoring device of the present invention can be used to monitor a wide variety of filter elements.

For example, in other embodiments, the filter monitoring device can be made so that the diameters or cross-sections and/or the lengths of passageway 332 in the annular member 330 and/or the chamber 343 in the first movable means 340 can be altered in dimensions from what is generally shown in the Figures herein such that the first movable means 340 receives greater or less or direct pressure from the fluid flowing through the passageway 332 and into the chamber 343.

In addition, the compression strength of the biasing means 360 can be altered such that it is easier or more difficult for the first movable means 340 to respond to the pressure being exerted upon it. Also, the strength of the magnet means 350 and/or 390 can be changed such that there is either greater or less repulsion of the second magnet means. Still further, the diameters and/or lengths of the chamber 320 and/or first movable means 340 can be altered such that the movable means 340 responds to different pressures.

Referring now in particular to FIG. 6, the upstream fluid enters the first pressure sensing port 224 and the passageway 332 and the chamber 343 and exerts a force on the pressure differential sensing means 230. Simultaneously, the downstream fluid enters the chamber 320 through the second pressure sensing port 226 and exerts a counterforce on the first movable means 340. Thus, a pressure differential is created between the first sensing port 224 and the second sensing port 226. The first movable means 340 moves in response to this pressure differential.

Movement of the first movable means 340 in a direction towards the second movable means 380 causes the second movable means 380 to move in a direction toward the distance sensing means 440. The distance sensing means 440 measures the distance between the second movable means 380 and the distance sensing means 440. The distance sensing means 440 is electrically associated with the comparator means and/or control panel (not shown in FIGS. 5 and 6) and continuously registers the movement of the movable means 380, thus showing the high, low or normal pressure occurring across the filter element.

The present invention is useful in a wide variety of filter assemblies. The filter monitoring device can measure various ranges of pressure differentials. This is an improvement over currently available filter monitoring device which have a preset pressure mechanism wherein each type of filter must use a separate type of indicator to monitor the pressure. In addition, according to the present invention, the filter monitoring device is operatively connected to a control panel or comparator means where any variations or fluctuations in the pressure and/or temperature are continuously recorded. The user or operator is then able to continuously view the fluctuations in pressure and can be immediately cautioned or warned when predetermined levels of pressure and/or temperature are exceeded.

The device of the present invention is useful for indicating the pressure differential and the amount of contamination of a fluid. The device of the present invention is useful to protect filter devices in closed fluid systems and can be suitably applied to any filtration system. The device of the present invention is also useful for providing a "spent" and "remaining life" indicators which are then useful to the operator for maintenance scheduling.

Although preferred embodiments and specific examples have been disclosed herein, it is to be understood by those skilled in the art that the scope of the invention is to be determined only by the following claims.

We claim:

1. A filter monitoring device comprising:

a differential pressure sensing means in communication with a fluid being filtered through a filter element in a filter assembly, the differential pressure sensing means including a housing defining a chamber, the housing defining a first differential pressure sensing port which extends through the housing and which is in communication with a first supply of fluid upstream of the filter element, and the housing defining a second pressure sensing port which extends through the housing and which is in communication with a second supply of fluid downstream of the filter element;

the differential pressure sensing means including a first movable means which is in communication with the fluid being filtered, the first movable means being axially positioned in the chamber and continuously movable in response to a change in the differential pressure of the fluid in the filter assembly;

the differential pressure sensing means further including a distance sensing means for continuously measuring or detecting movement of the first movable means; the distance sensing means being separated from the fluid in the filter assembly and not in contact with the movable means, the distance sensing means being operatively connected to a first indicator means which conveys the status of the differential pressure of the fluid in the filter assembly; the first indicator means providing a substantially continuous supply of data showing any change in the differential pressure across the filter element, whereby the first indicator means detects pressure variances which are due to contaminant buildup and/or changes in the temperature of the fluid being filtered so that the differential pressure sensing means does not falsely indicate a clogged filter element; and, the filter monitoring device further comprising a temperature sensing means for continuously measuring or detecting any change in the temperature of the fluid being filtered, the temperature sensing means being connected to a second indicator means for conveying, the status of the temperature of the fluid in the filter assembly, and providing a substantially continuous supply of data showing any change in the temperature of the fluid, whereby the temperature sensing means substantially eliminating a false pressure change indication due to high viscosity of the fluid when the fluid is at a low temperature.

2. The filter monitoring device of claim 1, wherein the first movable means is operatively connected to a mechanical biasing means wherein movement of the first movable means is kept substantially constant due to the compression strength of the biasing means.

3. The filter monitoring device of claim 2, wherein the first movable means comprises a first magnet, the first magnet being movable in a direction toward or away from the distance sensing means.

4. The filter monitoring device of claim 3, wherein the distance sensing means comprises a means for detecting change in a magnetic field generated by the first magnet as the first magnet moves in a direction toward or away from the distance sensing means.

5. The filter monitoring device of claim 3, wherein the distance sensing means comprises a Hall effect device which measures a potential difference created between two edges of a metal strip carrying a longitudinally flowing electric current when the strip is perpendicularly placed across a magnetic field.

6. The filter monitoring device of claim 3, wherein the distance sensing means comprises a reluctance device which measures change in impedance of a magnetized body due to change in a distance between magnetic elements.

7. The filter monitoring device of claim 3, wherein the distance sensing means comprises a capacitance device which permits storage of electricity when potential differences between conductors occur.

8. The filter monitoring device of claim 3, wherein the distance sensing means comprises an inductance device which determines electromotive force produced by a change of current.

9. The filter monitoring device of claim 3, wherein the distance sensing means comprises an ultrasonic device which measures acoustic waves of a desired frequency and changes in the waves or arrival time of ultrasonic pulses due to motion or travel of the first movable means.

10. The filter monitoring device of claim 3, wherein the distance sensing means comprises an optical device for measuring optical waves of a desired frequency and changes in the frequency due to motion or travel of the first movable means.

11. The filter monitoring device of claim 1, wherein the differential pressure sensing means further includes a second movable means being movable in response to movement of the first movable means, wherein the distance sensing means continuously measures or detects movement of the second movable means.

12. The filter monitoring device of claim 11, wherein the first movable means comprises a first magnet and the second movable means comprises a second magnet, the first magnet and second magnet being oriented such that like poles are in a spaced apart relationship, the second magnet being movable in a direction toward or away from the first magnet when the first magnet is moved in a direction toward or away from the second magnet.

13. The filter monitoring device of claim 1, wherein the first movable means is separated from the distance sensing means by a nonmagnetic portion of the housing.

14. The filter monitoring device of claim 1, wherein the first indicator means comprises a first electronic differential pressure indicator device for indicating when the differential pressure across the filter element is within a predetermined desirable range and a second electronic differential pressure indicator device for indicating when the differential pressure is above and/or below the predetermined range.

15. The filter monitoring device of claim 14, wherein the first electronic differential pressure indicator device comprises a green LED device and the second electronic differential pressure indicator device comprises a red LED device.

16. The filter monitoring device of claim 15, wherein the first and second electronic differential pressure indicator means are located on an outside portion of the housing and/or are located at a location remote from the filter assembly.

17. The filter monitoring device of claim 14, wherein the first indicator means indicates the presence or absence of the filter element in the filter assembly.

18. The filter monitoring device of claim 14, wherein the first indicator means indicates the remaining useful life of the filter element.

19. The filter monitoring device of claim 14, wherein the first and second electronic differential pressure indicator devices comprises at least one LED type device which indicates one color when the differential pressure across the filter element is within the predetermined range and which indicates a different color when the differential pressure is above and/or below the predetermined range.

20. The filter monitoring device of claim 14, wherein the first and second electronic temperature indicator devices comprise at least one LED type device which indicates one color when the temperature is within the predetermined range and which indicates a different color when the temperature is above and/or below the predetermined range.

21. The filter monitoring device of claim 1, wherein the second indicator means comprises a first electronic temperature indicator device for indicating when the temperature of the fluid being filtered is within a predetermined desired range; and a second electronic temperature indicator device for indicating when the temperature of the fluid being filtered is above and/or below the predetermined range.

22. The filter monitoring device of claim 21, wherein the first and second temperature indicator means are located on an outside portion of the filter assembly and/or are located at a location remote from the filter assembly.

23. The filter monitoring device of claim 21, wherein the first electronic temperature indicator device comprises a green LED device and the second temperature indicator device comprises a red LED device.

24. The filter monitoring device of claim 1, wherein the housing defining the first and second pressure sensing ports, the distance sensing means and the first indicator means are made of nonmagnetic materials.

25. The filter monitoring device of claim 1, wherein the pressure sensing means and the temperature sensing means are operatively connected to a remote location using a current-type outlet to prevent receiving ambient electromagnetic noises.

26. The filter monitoring device of claim 1, wherein the distance sensing means is connected to the first indicator means using a microprocessor or logic circuitry.

27. The filter monitoring device of claim 1, wherein the temperature sensing means is connected to the second indicator means using a microprocessor or logic circuitry.

28. The filter monitoring device of claim 1, wherein the chamber has a first open end which matingly receives an angularly extending member having at least one axially passageway extending therethrough, the passageway forming the first differential pressure sensing port, the passageway having a diameter which dampens undesirable surges in the first supply of fluid flowing through the filter element.

29. The filter monitoring device of claim 28, wherein the angularly extending member has a different diameter or cross-section and/or length, whereby the first movable means receives greater or lesser direct pressure from the fluid passing through the passageway and into the chamber.

* * * * *

UNITED STATES PATENT AND TRADEMARK OFFICE

CERTIFICATE OF CORRECTION

PATENT NO. : 5,702,592

DATED : December 30, 1997

INVENTOR(S) : Kanwar Suri & Z. Paul Akian

It is certified that error appears in the above-identified patent and that said Letters Patent is hereby corrected as shown below:

At column 7, line 47, delete "low-temp" and insert --low-temp--.

At column 18, line 10, after "length" insert --than the passageway--.

Signed and Sealed this

Ninth Day of June, 1998

Attest:

BRUCE LEHMAN

*Attesting Officer*

*Commissioner of Patents and Trademarks*